United States Patent Office 3,186,909
Patented June 1, 1965

3,186,909
STABILIZED VITAMIN COMPOSITION AND
METHOD OF MAKING SAME
Grayce E. McMurtry, New York, N.Y., and
John J. Marvinny, Jersey City, N.J.
No Drawing. Filed Apr. 12, 1961, Ser. No. 122,602
15 Claims. (Cl. 167—81)

The present invention relates to the stabilization of vitamins against loss in potency. It is particularly concerned with vitamin A compositions which have high potency and which are suitable for addition to animal feeds and which will retain vitamin potency for long periods of time.

The present joint application is a continuation-in-part of our abandoned application Serial No. 740,213, filed June 6, 1958.

Vitamin A, whether in pure form, ester form or other well-known forms, is subject to rapid loss in vitamin potency upon storage unless it is suitably stabilized. Many well-known materials which are commonly used for stabilization of fats, such as oil-soluble amines, citric acid esters, phenolic anti-oxidants, etc. have been proposed for the stabilization of vitamin A concentrates, such as concentrates obtained from fish liver oils and the like. All of such materials heretofore proposed and combinations of them, while improving stability of vitamin concentrates still permit the concentrate to lose potency at a very substantial rate.

It is an object of the present invention to provide new compositions having a relatively high concentration of vitamin A, in which the vitamin A potency is maintained at a much higher level than heretofore obtainable.

It is another object of the present invention to provide a vitamin concentrate in a form suitable for easy addition to animal feeds and in which the loss of vitamin A is exceedingly low.

It is another object of the present invention to provide a vitamin-containing food which is free from agents such as oil-soluble amines which may cause undesirable side effects and in which the vitamin A content is substantially retained over long periods of storage.

It is still another object of the present invention to provide a vitamin concentrate which may be sold in the form of flakes or powder for addition to animal feeds and which retains vitamin A potency over long periods of time.

Other objects of the present invention will be apparent from the following description of the invention and the appended claims.

We have found that the vitamin A is stabilized by fatty alcohol esters of long-chain fatty acids whether synthetic or natural, such for example as obtained from sperm oil and preferably by a combination of such esters with gelatin and/or urea. It is further intended that where the term "sperm whale oil or sperm oil" is used, that it is intended to cover all fatty alcohol esters of the same general type if derived from natural or manufactured sources, as well as the fatty alcohols or their esters and/or fatty alcohols derived from vegetable sources. These fatty alcohol esters are surprisingly effective even alone. They are preferably but not necessarily hydrogenated to increase their hardness and softening point and are esters of long-chain monobasic acids and long-chain alcohols. They are non-toxic. There is a synergistic action between the nitrogen-containing gelatin and/or urea and these fatty alcohol esters which stabilize vitamin A in vitamin compositions in an almost unbelievable manner. The fatty acids may contain chemical unsaturation, i.e., carbon-to-carbon double bonds in either the alcohol or acid residue, or both. It is apparently not the unsaturation in these esters that provides the unique result, for it appears that the effect of hydrogenation is only to increase the melting point of the esters and facilitate formation of a flaky powder, which is most desirable. The long-chain alcohol residues and the long-chain acid residues in the fatty alcohol esters have 12 to 22 carbon atoms. Both the alcohols and acids from which these esters are formed are substantially linear, i.e., they are unbranched or have, if any, only a slight amount of branching, so that there is a linear chain of at least 12 carbon atoms in both the alcohol and acid residues of the esters.

A composition of the present invention preferably but not necessarily contains besides natural or synthetic vitamin A, gelatin (and/or urea) and fatty alcohol esters, a separating agent having food value, such as the dried residue from skim milk, dextrin solution, corn syrup, brewers' solubles, etc. which help keep spray dried particles from adhering together. If desired, suitable wax may be incorporated to raise the melting point of the composition. Such wax is especially desirable when the fatty acid esters of fatty alcohols, such as obtained from the oil of seafaring mammals such as sperm whale oil, are not hydrogenated and are therefore soft or low melting. Examples of such waxes which may be used to raise melting point and hardness are vegetable waxes such as carnauba wax, waxes obtained from petroleum such as microcrystalline wax, hydrogenated oils, fats or waxes derived from glycerides, such as soy bean oil and tall oil, animal waxes, insect waxes such as beeswax, spermaceti wax, and combinations of the above-mentioned.

The fatty alcohol esters of fatty acids are generally used in the present invention in an amount substantially in excess of the amount of gelatin. However, the synergistic action of the gelatin and the fatty alcohol esters in preserving the vitamin potency of the material is so great that only a relatively small proportion of the gelatin, such as about 0.3 or 0.4% or so in relation to the total of gelatin plus fatty alcohol ester, and as much as 50 or 60% of gelatin in the synergistic vitamin-stabilizing mixture of gelatin and said esters may be present. Preferably, the amount of gelatin is about 2% to about 8 or 10% of this mixture. The vitamin A concentration in the composition may of course vary as widely as desired, but in a concentrate for addition to feeds it is generally 1% to 10 or 12% of the said ester-gelatin mixture. The power separating agents which are nontacky when dried are of course added in the proportions desired, but in the final composition these nontacky, dried, water-soluble or dispersible solids are preferably maintained between ½% and 25% of the weight of the composition.

The preferred method of combining the ingredients of the vitamin compositions of the present invention is to prepare a fluid dispersion or solution (preferably an aqueous dispersion or solution) of a natural or synthetic vitamin A concentrate (including vitamin A, esters, etc.), gelatin (and/or urea) and a dispersion or solution (preferably aqueous) of separating agent, such as corn syrup, skim milk, etc. This mixture is then spray dried to eliminate the fluidizing agent (volatile solvent or water) and to form a powder containing the vitamin A concentrate. The dried separating agent, such as corn syrup, skim milk, dextrin, etc. greatly facilitates the maintenance of this mixture in powder form for easy blending into the fatty alcohol esters. It is conveniently present in amount of about 4 or 5% to 30 or 35% of the solids in the fluid solution or dispersion. The powder thus obtained containing the vitamin A in concentrated form may then be mixed into the melted fatty alcohol ester or mixture of fatty alcohol ester and wax, which preferably also contains antioxidants or preservatives that may be desirable. The melted mixture may then be sprayed or flaked at a temperature above its melting point and preferably below 200° F. and usually between 150 and 190° C. to obtain the composition of the present invention in the powder or flake form especially desirable for addition to feeds.

The following examples, in which parts are by weight, illustrate the preferred method of preparing compositions of the present invention.

EXAMPLE 1

About 30 parts of natural or synthetic vitamin A, 10 parts of gelatin, 20 parts of corn syrup or skim milk, 40 parts by weight of water are formed into a solution or dispersion in water at a temperature of 130 to 190° F. The solution thus obtained is spray dried to obtain a dry powder consisting of 50% of vitamin A, 25% of gelatin, and 25% of corn syrup solids or skim milk solids which function as a particle separating agent as well as a food. The powder thus obtained is then thoroughly mixed into a melted mixture of (1) 84.1 parts by weight of Hywax 120, which is a trade name for hydrogenated esters obtained from sperm whale oil and having a melting point of about 120° F., and containing principally esters of long-chain alcohols in which both the alcohol and the acid residue have 12 to 22 carbon atoms, and (2) an antioxidant mixture consisting of .2 part by weight of citric acid, .1 part by weight of BHA (butylated hydroxy anisole), .1 part by weight of propyl gallate, and ±.5 part of Santoquin (an antioxidant produced by the Monsanto Chemical Company).

The mixture thus formed is spray dried at 150 to 190° F. to obtain the stabilized feed additive of the present invention in powder form.

In the above example, the vitamin A in the initial aqueous solution or dispersion is usually maintained within 10 and 60 parts and it may be substituted in whole or in part by fish liver oil containing the vitamins or by vitamin A acetate, palmitate, etc. The gelatin in said aqueous dispersion is preferably held between 4 or 5 and 35 parts. The corn syrup or skim milk may be present between 4 or 5 and 35 parts. Between about 35 and 65 or 70 parts of water is usually used in order to most conveniently form the powder for addition to the melted fatty alcohol ester. The product produced by spray drying the aqueous mixture is preferably between 1 and 25% of the final composition.

The antioxidants used may be omitted or substituted in whole or in part by other antioxidants recognized as not harmful in food. The hydrogenated fatty alcohol esters may be substituted by the nonhydrogenated fatty alcohol esters from sperm whale oil or from oil of seafaring mammals, without loss of stabilizing action. However, in such a case, it is preferred that a higher melting wax, such as one or more of those before mentioned, be also mixed with said fatty alcohol esters to increase hardness of the composition.

EXAMPLE 2

The product prepared in Example 1, labeled "Sample 2H," was submitted to a large midwestern university foundation laboratory for a chick liver storage study and tested against a negative control and the customary vitamin A concentrate, a USP oil. The ingredients were mixed into chick feed to form the feed having the concentrations of vitamin A shown in the Table I. Day-old, sexed cockerel White Rock chicks were randomly distributed twenty per lot, into five lots. The birds were housed in a Jamesway electrically heated battery brooder with raised wire floors. Weekly weights were recorded and these weights with the levels of supplementation and a copy of the basal ration are given in the following table. At five weeks of age, the birds were sacrificed and each lot subdivided into Lots A and B. The livers of these sublots were pooled and run for their vitamin A content. These liver values are also given in the Table I.

*Table I*

| Treatment | Lot | Units/gm. | Units/liver | Ave., units/liver |
|---|---|---|---|---|
| Negative control | A |  |  |  |
|  | B |  |  |  |
| USP oil, 2,000 units/lb. | A | 17.7 | 212 | 214 |
|  | B | 15.9 | 215 |  |
| USP oil, 4,000 units/lb. | A | 90.7 | 1,180 | 1,280 |
|  | B | 106.0 | 1,370 |  |
| Sample 2H, 2,000 units/lb. | A | 41.5 | 506 | 446 |
|  | B | 33.2 | 386 |  |
| Sample 2H, 4,000 units/lb. | A | 151.0 | 2,240 | 2,400 |
|  | B | 210.0 | 2,560 |  |

*Method.*—Ames, Risley and Harris, Anal. Chem., 26, 1379 (1954). All twenty chicks in control lot were dead before five weeks.

EXAMPLE 3

A sample of vitamin A, which was prepared in accordance with Example 1 above and labeled "2H," was submitted to a research laboratory of a large alumni research foundation of a midwestern university for determination of vitamin A potency after aging. In accordance with the test, the sample was assayed for vitamin A potency before mixing into the feed. Five pounds of commercial rations were fortified to give 100 units per gram based on the vitamin A assay. USP reference standard oil of 100,000 units per gram was mixed into 5 pounds of the same commercial ration and used as the control. Each mix was assayed for vitamin A in duplicate. 10 grams samples were placed in a 37° C. incubator and reassayed for vitamin A at two and at four weeks. The results are given in the following table:

*Table II*

|  | "0" time | | Two weeks | | Four weeks | |
|---|---|---|---|---|---|---|
|  | Units/gm. | Ave. | Units/gm. | Ave. percent ret. | Units/gm. | Ave. percent ret. |
| Sample 2H | 113; 110; 106 | 110 | 95; 91; 93 | 84.5 | 94; 96; 95 | 86.4 |
| USP Ref. oil | 101; 102 | 102 | 67; 73; 70 | 68.6 | 45; 44; 45 | 44.1 |

It is seen from the above that the percent retention even after four weeks at this elevated temperature was 86% of the original vitamin concentration compared to 44.1% in the USP reference oil. This is an outstanding retention. Furthermore, the feed containing the sample "2H" lost no potency at all after the two weeks of aging.

The compositions of the present invention should ordinarily have a melting point above 30° C. and preferably a softening point above 35° C. If the mixture has a softening point below the desired value, sufficiently high melting point wax is preferably incorporated with the said esters to bring the softening point to the desired value.

When urea is used in place of gelatin, we preferably dissolve the urea in the melted fatty alcohol esters. A commercial product such as "Hywax 120" which is the hydrogenated fatty alcohol esters of fatty acids, derived from sperm whale oil is preferably used.

When the urea is completely dissolved in the fatty alcohol esters of fatty acids (derived from sperm whale oil), fish liver oil containing vitamin A is blended. The resulting formula can be molded into blocks, extruded, pulverized, ground, flaked or spray chilled and packaged for shipment or added to feed.

The fish liver oil employed may be the commercial variety containing multiple units of vitamin A per gram (USP XIV), a synthetic crystalline vitamin A, such as palmitate, acetate, or a vitamin A containing oil or substance from another source. The range of potencies that were used for our experiments were from 200,000 to 400,000 units per gram, but we do not wish to be limited on range of potencies.

The following six examples showing the range of percentage of urea that may be employed in the composition are from 0.25% to 25%. From tests we have ascertained that the preferred range is from 1% to 10% urea and the greater retention of vitamin potency in the formulations is obtained when a percentage of from 3% to 5% urea is utilized.

Employing a recognized method of vitamin A analysis and incorporating the feed supplement in a highly mineralized mix stored at 45° C. to accelerate reduction in potency of vitamin A, also commonly referred to as destruction of vitamin A. Following are the results of the tests with respect to (4) a feed supplement employing no urea and tests 5, 6, 7, 8, showing the marked increase in retention of vitamin A in the blends from 1% to 10% urea, with the best results from 3% to 5% and when no "Hywax" is employed.

tional experiments were also run, containing up to 25% urea, including some wherein other carriers such as "Moby Dick Wax 95%" were used in place of the hydrogenated "Hywax 120" of formulations 4, 5, 6, 7, 8 shown in Table III. Moby Dick Wax 95% is a trade name for a wax whose source is from the sperm whale and comprises fatty alcohol esters of fatty acids from the oil thereof and has properties similar to those of the Hywax 120. The results of all experiments run proved conclusively that the presence of urea in amounts up to approximately 25%, increased the retention to a marked degree as compared to the 100% fish liver oil (Example 9), and that urea in combination with any of the tested types of fatty alcohol esters of fatty acids derived from marine mammals was even more effective in retaining such potency.

The composition may contain, in addition to the essential ingredients as indicated above, also other ingredients, as for example, various types of waxes in order to influence the hardness, and melting point to the composition. Such waxes are known for this purpose and form no part of the present invention. Examples of such waxes which may be used in this manner are: (1) vegetable waxes, such as carnauba wax, (2) microcrystalline waxes, such as hydrocarbon type of wax common in the petroleum industry, (3) hydrogenated oils, fats or waxes as derived from glycerides such as soybean oil and tallow, (4) animal waxes, (5) insect waxes, such as beeswax, (6) spermaceti wax and the combinations of the above mentioned.

Typical proportions found suitable are hereinafter set forth in Table IV as illustrative examples of compositions containing wax hardness and as contemplated by the instant invention.

*Table IV*

Percentages by weight

| Formulation No. | 7 | 8 | 9 | 10 | 11 | 12 | 13 | 14 | 15 | 16 |
|---|---|---|---|---|---|---|---|---|---|---|
| INGREDIENT | | | | | | | | | | |
| Fish liver oil | 20.0 | 20.0 | 20.0 | 20.0 | 20.0 | 20.0 | 20.0 | 20.0 | 20.0 | 20.0 |
| Urea | 3.0 | 3.0 | 3.0 | 3.0 | 3.0 | 3.0 | 3.0 | 3.0 | 3.0 | 3.0 |
| "Hywax 120" | 72.0 | | 36.0 | | 36.0 | | | 72.0 | | |
| Carnauba wax | 5.0 | 5.0 | 5.5 | 77.0 | | | | | | |
| "Moby Dick Wax 95" | | 72.0 | 36.0 | | 36.0 | | | | 72.0 | |
| Microcrystalline wax, melting point, 190/195° F. | | | | | 5.0 | | | | | |
| Paraffin wax | | | | | | 77.0 | | | | |
| Hydrogenated castor oil | | | | | | | 77.0 | | | |
| Candelilla wax | | | | | | | | 5.0 | | |
| Beeswax | | | | | | | | | 5.0 | |
| Spermaceti wax | | | | | | | | | | 77.0 |
| Total | 100.0 | 100.0 | 100.0 | 100.0 | 100.0 | 100.0 | 100.0 | 100.0 | 100.0 | 100.0 |

*Table III*

| Formulae | Initial potency value of vitamin A | Potency of vitamin A after storage equivalent to 70 days | Percent of retention of vitamin A |
|---|---|---|---|
| Ex. 4: FLO*, 20%; HY W 120, 80% | 42,028 | 31,521 | 75.0 |
| Ex. 5: FLO*, 20%; Urea, 1%; HY W 120, 79% | 42,014 | 33,779 | 80.4 |
| Ex. 6: FLO*, 20%; Urea, 3%; HY W 120, 77% | 41,368 | 38,059 | 92.0 |
| Ex. 7: FLO*, 20%; Urea, 5%; HY W 120, 75% | 42,268 | 39,521 | 93.5 |
| Ex. 8: FLO*, 20%; Urea, 10%; HY W 120, 70% | 42,094 | 35,233 | 83.7 |
| Ex. 9: Fish liver oil, 100% | | | 7.5 |
| Ex. 10: Fish liver oil, 95%; Urea, 5% | | | 13.0 |

*Where initials FLO are used—this designates "Fish liver oil," HY W 120 means "Hywax 120."

Table III shows the results of a few of the experiments which were run, and illustrates the marked increase in retention of vitamin in compositions containing from zero urea content up to 10% urea content, by weight. Addi- It is to be understood that the proportions given in the above formulations, both in Table III and Table IV may be varied considerably, with and without ingredients other than those indicated herein as essential. Suitable proportions are from about 0.25% to about 25% urea by weight, with a carrier (when used) preferably containing the fatty alcohol esters of fatty acids derived from marine mammals such as from sperm whale oil, about 5.0 to about 77% of a wax hardener, and the balance comprising vitamin A such as fish liver oil containing natural vitamin A, also synthetic vitamin A such as palmitate, and acetate and other vitamins whether natural or synthetic. The wax hardener contents may be varied with satisfactory results over wide limits, depending upon the desired hardness and melting point desired.

One method of preparing the composition is as follows: The fatty alcohol esters of fatty acids derived from marine mammals, such as from sperm whale oil or hydrogenated sperm whale oil, are first melted in a suitable container and heated to approximately 90° C. The desired quantity of urea is then added to the melt, at the above temperature or at varying lower or higher temperatures, while the melt is vigorously agitated. After the urea has been completely dissolved, the vitamin A, in the form of fish liver oils or other forms such as synthetic and/or other vitamins is gradually added to the solution, while continually stirring. Hardening waxes are then added, if desired, and the melted liquid is passed to conventional equipment for forming it into solid beaded or flaked particles in which form it is blended with feed ingredients. The flaked or beaded particles are usually packaged in paper or cloth bags or fibre containers.

In our application Serial No. 740,213, we pointed out that while the defined fatty alcohol esters of fatty acids such as those of hydrogenated sperm whale oil had been used principally to demonstrate that these materials prolonged the potency of vitamin A, the invention could be used "to prolong the potency of other vitamins contained in fish oil and any other vitamins suitable for inclusion in feed supplements." We, also, disclosed that the defined fatty alcohol esters of fatty acids are preferably used in combination with urea for the stabilization of oil-soluble vitamins.

It is apparent that in accordance with the provisions of the patent statutes, modifications of the invention may be made without changing the spirit thereof.

Having described our invention, we claim:

1. A method of producing an improved feed supplement comprising a fish liver oil containing vitamin A and other synthetic and natural vitamins having a prolonged vitamin potency, comprising the steps of heating to above its melting point a composition containing essentially fatty alcohol esters of fatty acids derived from sperm whale oil, said fatty alcohol esters of fatty acids containing from 12 to 22 carbon atoms, adjusting said composition to a temperature of approximately 90° C., adding urea to said composition while stirring, continuing the stirring until the urea is completely dissolved, adding fish liver oil and additional vitamins, constantly stirring to a homogeneous mixture and preparing same for packaging, said urea being present in amounts of .25 to 25% of the weight of the ingredients in said feed supplement.

2. A feed supplement composition for animals comprising an oil solution of oil-soluble vitamins containing vitamin A, an ester of a fatty alcohol and a fatty acid, said alcohol and acid each containing 12 to 22 carbon atoms with at least 12 carbon atoms in a straight chain, and from about 0.25% to about 25.0% by weight urea wherein the vitamins are stabilized.

3. The composition according to claim 2 wherein the urea is present in an amount of from about 1% to about 10% by weight.

4. The composition according to claim 3 wherein there are included petroleum waxes.

5. The composition according to claim 3 wherein there are included at least one member of the group consisting of animal and vegetable glyceride oils.

6. The composition according to claim 2 wherein the urea is present in an amount of from about 3% to about 5% by weight.

7. The composition according to claim 2 wherein the acid ester is derived from sperm whale oil.

8. The composition according to claim 2, in which the ester is sperm whale oil containing essentially saturated fatty alcohol esters of fatty acids in solid, refined, wax form.

9. The composition according to claim 2 wherein the oil consists of fish liver oils and the urea is present in an amount of from about 1% to about 10% by weight.

10. The composition according to claim 9 wherein the urea is present in an amount from about 3% to about 5% by weight.

11. The composition according to claim 7 wherein the oil consists of fish liver oils.

12. The composition according to claim 11 wherein a wax hardener is present.

13. A feed supplement as set forth in claim 2, wherein the vitamin is present as a concentrate.

14. The composition as set forth in claim 2 wherein there is included gelatin.

15. The composition as set forth in claim 2 wherein part of the urea is substituted by gelatin.

References Cited in the file of this patent

UNITED STATES PATENTS

| | | |
|---|---|---|
| 2,167,144 | Barton | July 25, 1939 |
| 2,218,592 | Taylor | Oct. 22, 1940 |
| 2,768,112 | Buckwalter | Oct. 23, 1956 |
| 2,777,797 | Hochberg | Jan. 15, 1957 |

OTHER REFERENCES

Jenkins: The Chemistry of Organic Medicinal Products, second edition, 1941, John Wiley and Sons Inc., London, pages 256–258.